United States Patent Office 3,147,311
Patented Sept. 1, 1964

3,147,311
1,1,2,2-SUBSTITUTED GLYCOLS
Bruno Hofer, Basel-Land, and Willy G. Stoll, Basel, Switzerland, assignors to Geigy Chemical Corporation, Ardsley, N.Y., a corporation of Delaware
No Drawing. Filed June 22, 1959, Ser. No. 821,692
Claims priority, application Switzerland July 4, 1958
1 Claim. (Cl. 260—635)

The present invention concerns a process for the production of new glycols as well as the compounds obtained by this process which have valuable pharmacological properties.

Glycols of the general formula

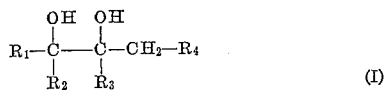

wherein
$R_1$ represents an alkyl or cycloalkyl radical,
$R_2$ and $R_3$ represent low molecular alkyl radicals, and $R_2$ and $R_1$ may jointly represent a polymethylene radical, and
$R_4$ represents an unsaturated aliphatic hydrocarbon radical having 2-3 carbon atoms, have not been known up to now. It has now been found that these compounds have sedative, hypnotic to anaesthetic activity. They also have an anticonvulsive action and can be used in particular, as tranquilisers. In addition, they potentiate the action of other anaesthetics and can also be used as intermediate products for the production of other pharmacologically valuable substances.

The compounds defined above can be produced by reacting a hydroxy ketone of the general formula

wherein $R_1$, $R_2$ and $R_3$ have the meanings given above, with a metal organic compound consisting of magnesium or zinc and a halide of the general formula $$Hal—CH_2—R_4 \qquad (III)$$

wherein Hal represents chlorine, bromine or iodine and $R_4$ has the meaning given above and, if desired, by hydrogenating the compounds I in which the radical $R_4$ contains a triple bond to form compounds having a double bond in this radical. The reaction of one mol of an α-hydroxy ketone of the general Formula II with essentially two mols of a compound consisting of magnesium and a halide of the general Formula III is generally performed with good yields, an organic solvent being used as reaction medium which contains one or more oxygen atoms bound between hydrocarbon radicals, for example, an ether or ether-type solvent such as diethyl ether or tetrahydrofurane, or an acetal such as dimethyl formal.

The α-hydroxy ketones of the general Formula II wherein $R_2$ and $R_3$ are methyl groups used as starting material, are obtained for example by condensing methyl ketones of the formula $R_1$—CO—$CH_3$ with alkali metal acetylides and then adding water, for example, in the presence of mercury oxide and sulphuric acid, to the ethinyl-methyl carbinols obtained. The reaction of α-hydroxycarboxylic acids with methyl lithium according to Billimoria et al. (J. Chem. Soc. 1951, 3067) can also be mentioned; α-hydroxy ketones of the general Formula II are also obtainable from ketones of the general formula $R_1$—CO—$R_2$. These are first converted into the corresponding cyanohydrins and the hydroxyl group thereof is blocked, e.g. by acylation or by reacting it with dihydropyranes or a vinyl ether. The O-acyl derivatives, O-tetrahydropyranyl derivatives or O-(α-alkoxy-ethyl)-derivatives of nitriles of branched chain α-hydroxy-alkane carboxylic acids, of α-hydroxy-α-cycloalkyl acetonitriles or α-hydroxy-α-aryl acetonitriles so obtained can be reacted with alkyl magnesium halides of the formula $R_3$—Mg—Hal, to form imines, from which the α-hydroxy ketones of the general Formula II are obtained by hydrolysis. Examples of suitable α-hydroxy ketones are 3-methyl-3-hydroxy-butanone-(2), 3-methyl-3-hydroxy-pentanone-(2), 4-methyl-4-hydroxy-pentanone-(3), 3-methyl-3-hydroxy-hexanone-(2), 4-methyl-4-hydroxy-hexanone-(3), 4-ethyl-4-hydroxy-hexanone-(3), 3-methyl-3-hydroxy-heptanone-(2), 4-methyl-4-hydroxy-heptanone-(3), 3.5-dimethyl-3-hydroxy-hexanone-(2), 4.5-dimethyl-4-hydroxy-hexanone-(3), 4-methyl-4-hydroxy-octanone-(3), 4.5.5-trimethyl-4-hydroxy-hexanone-(3), 3-cyclopropyl-3-hydroxy-butanone-(2), 3-cyclopropyl-3-hydroxy-pentanone-(2).

Examples of unsaturated aliphatic halides of the general Formula III are allyl chloride, allyl bromide, allyl iodide, crotyl chloride, crotyl bromide, 4-bromobutene-(1), methallyl chloride, methallyl bromide, propargyl bromide and 4-bromobutine-(1).

α-ketones of the general Formula II, wherein $R_1$ and $R_2$ together represent an alkylene radical and in which $R_3$ is the methyl group, are obtained for example, by condensing cycloaliphatic ketones with alkali metal acetylides and adding water to the ethinyl cycloalkanols so obtained, or by the above mentioned reaction of α-hydroxy carboxylic acids with methyl lithium; or if $R_3$ is an alkyl radical containing 2–4 carbon atoms, by reacting cyanohydrins of suitable cycloaliphatic ketones (after blocking the hydroxyl group as described above) with low molecular alkyl magnesium halides to form imines from which the α-hydroxy ketones of the general Formula II can be obtained by hydrolysis. Examples of such compounds are 1-acetyl-, 1-propionyl-, 1-butyryl- and 1-isobutyryl- cyclopentanol, 1-acetyl-methyl cyclopentanol, 1-acetyl-dimethylcyclopentanol, 1-acetyl-, 1-propionyl-, 1-butyryl-, 1-isobutyryl-, 1-valeryl- and 1-isovaleryl- cyclohexanol, 1-acetyl-2-methyl-cyclohexanol, 1-acetyl-4-methyl-cyclohexanol, 1-acetyl-dimethyl cyclohexanols, 1-acetyl-hexanol, the 1-acetyl-dimethyl cyclohexanols, 1-acetyl- and 1-propionyl- cycloheptanol as well as 1-acetyl-cyclooctanol.

A compound according to the present invention, e.g. one of those named in the examples, can be used as tranquiliser. It is given perorally in the form of tablets or capsules each containing 0.1 to 0.3 g. of active ingredient in a dosage of 1 to 6 dosage units for an adult person daily.

The following examples further illustrate the production of the new compounds. Parts are given therein as parts by weight and their relationship to parts by volume is as that of grammes to cubic centimetres. The temperatures are in degrees centigrade. Where boiling points are expressed with reference to a subscript (as for instance "B.P.$_8$"), the subscript shows the pressure in millimeters of mercury under which the substance boils at the temperature given; (thus B.P.$_8$ 65° signifies a boiling point of 65° under a pressure of 8 mm. Hg).

*Example 1*

An allyl magnesium bromide solution is prepared according to Organic Syntheses 36, 61 (1956) from 24.3 parts of Mg, 1 small iodine crystal and 60.5 parts of allyl bromide, using in all 350 parts by volume of absolute ether. 28.8 parts of 3.5-dimethyl-3-hydroxyhexanone-(2) (B.P.$_8$ 65°), dissolved in 50 parts by volume of absolute ether are added to this solution dropwise within 1½ hours at a reaction temperature of less than 20°. After stirring for 4 hours at room temperature, 100 parts of water are added dropwise to the reaction mixture while cooling with ice whereupon the mixture is made acid to Congo red paper by the careful addition of 50% sulphuric acid. A further 100 parts of water are then added whereupon the product is worked up quickly as follows: The precipitate is filtered off under suction and washed with water. The organic phase of the filtrate is separated and the aqueous phase is shaken out three times with 100 parts by volume of ether. The combined organic solutions are washed until the washing water is neutral, dried over sodium sulphate and, after removal of the solvent, the residue is purified by repeated distillation under reduced pressure. The 4.5.7 - trimethyl - 4.5 - dihydroxy-octene-(1) boils at 109–111° under 11 mm. pressure.

2-(1'-hydroxy-cyclopentyl)-2-hydroxy-pentene-(4), B.P.$_{11}$ 119.5–121.5°, M.P. 35.5–37°,
2-(1'-hydroxy-cyclohexyl)-2-hydroxy-pentene-(4), B.P.$_{10}$ 130–134°, M.P. 67–70°
4.5-dimethyl-4.5-dihydroxy-hexene-(1), B.P.$_{20}$ 97–100°,
4.5-dimethyl-4.5-dihydroxy-octene-(1), B.P.$_{11}$ 111°, M.P. 41–44° (from ether/pentane)
4.5.6.6-tetramethyl-4.5-dihydroxy-heptene-(1), B.P.$_{11}$ 111–112.5°,
4.5-dimethyl-4.5-dihydroxy-heptene-(1), B.P.$_{19}$ 104–105°, M.P. 42–44° (from ether/pentane)
4-methyl-5-cyclohexyl-4.5-dihydroxy-hexene - (1), B.P.$_{10}$ 132°, M.P. 77–79° (from pentane)
4-methyl-5-cyclopropyl-4.5-dihydroxy-hexene-(1), B.P.$_{10}$ 108–111°, and
4.5-diethyl-4.5-dihydroxy-heptene-(1), B.P.$_{5}$ 103–105° are obtained in an analogous manner on using the corresponding starting materials.

*Example 2*

12.2 parts of amalgamated magnesium and 200 parts by volume of absolute ether are placed in a dry three-necked flask and 65 parts of propargyl bromide in 50 parts by volume of absolute ether are added dropwise while stirring within half an hour. The ether boils slightly under reflux. On completion of the addition, the reaction mixture is stirred for 14 hours at room temperature. Then 32.5 parts of 3-methyl-3-hydroxy-hexanone-(2), B.P.$_{50}$ 95°, dissolved in 50 parts by volume of absolute ether are added within 1 hour at an inner temperature of about 30–35°. After stirring for another 4 hours at room temperature, 50 parts by volume of water are then added to the reaction mixture while cooling with ice whereupon it is made acid to Congo red paper with 50% sulphuric acid.

After working up analogously to Example 1, 4.5-dimethyl-4.5-dihydroxy-octine-(1) is obtained. B.P.$_{9}$ 104–106°; $n_D^{20}$ 1.471.

On using the corresponding starting material, 4.5.6-trimethyl - 4.5 - dihydroxy-heptine-(1), B.P.$_{8}$ 99–103°; $n_D^{20}$ 1.478, is obtained in an analogous manner.

*Example 3*

8.5 parts of 4.5-dimethyl-4.5-dihydroxy-octine-(1) are dissolved in 50 parts by volume of ethanol, 1 part of Lindlar catalyst (Lindlar, Helv. Chim. Acta 35, 446 (1952)) and 0.35 part of synthetic quinoline (Cram et al., J. Am. Chem. Soc. 78, 2518 (1956)) are added and the whole is hydrogenated at room temperature and normal pressure. The hydrogenation ceases before one mol of hydrogen (per mol acetylenic glycol) has been taken up. After filtering off the catalyst and removing the solvent, the residue is fractionated with the aid of a Buchi spinning band column. A good yield of 4.5-dimethyl-4.5-dihydroxy-octene-((1) is obtained. B.P.$_{10}$ 108–109°. The substance crystallises and can be recrystallised from ether/pentane; M.P. 41–44°. The melting point of the product mixed with that obtained according to Example 1 is 41–44°. Thus both compounds are identical.

*Example 4*

The Grignard reactant is produced in a manner analogous to that described in Example 1 from 49.0 parts of magnesium, 100.0 parts of freshly distilled methallyl chloride and, in all, 700 parts by volume of absolute ether. The further reaction with 57.6 parts of 3.5-dimethyl-3-hydroxy-hexanone-(2) in 100 parts by volume of absolute ether as well as the hydrolysis is performed analogously to Example 1, whereupon 2.4.5.7-tetramethyl-4.5-dihydroxy-octene-(1) is obtained, B.P.$_{12}$ 119.5°; $n_D^{20}$ 1.464.

What we claim is:
The compound of the formula

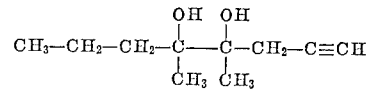

References Cited in the file of this patent
FOREIGN PATENTS
202,124    Austria _____ Feb. 10, 1959

OTHER REFERENCES

Bernard et al.: Chem. Abstracts, vol. 40 (1946), 834–35 (2 pages).

Papa et al.: Jour. Amer. Chem. Soc., vol. 76 (1954), 4446–50 (5 pages).